(12) United States Patent
Lai et al.

(10) Patent No.: US 11,768,785 B2
(45) Date of Patent: Sep. 26, 2023

(54) SERIAL PERIPHERAL INTERFACE CIRCUIT AND CALIBRATION METHOD OF SERIAL PERIPHERAL INTERFACE SYSTEM

(71) Applicant: Prime World International Holdings Ltd., New Taipei (TW)

(72) Inventors: Hung-Yi Lai, New Taipei (TW); Cheng-Hung Ho, New Taipei (TW); Hsin-Wen Lin, New Taipei (CN)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 17/678,320

(22) Filed: Feb. 23, 2022

(65) Prior Publication Data
US 2023/0267086 A1    Aug. 24, 2023

(51) Int. Cl.
*G06F 13/36* (2006.01)
*G06F 13/362* (2006.01)
*G06F 13/42* (2006.01)

(52) U.S. Cl.
CPC ........ *G06F 13/362* (2013.01); *G06F 13/4282* (2013.01)

(58) Field of Classification Search
CPC ............................ G06F 13/362; G06F 13/4282
See application file for complete search history.

(56) References Cited

U.S. PATENT DOCUMENTS

| | | | |
|---|---|---|---|
| 8,380,914 B1* | 2/2013 | Kale | G11C 8/04 711/2 |
| 10,055,376 B1* | 8/2018 | Newkirk | G06F 13/4068 |
| 10,979,044 B2* | 4/2021 | Rumpler | G06F 1/24 |
| 2014/0075072 A1* | 3/2014 | Alley | G06F 13/4291 710/110 |
| 2015/0363353 A1* | 12/2015 | Enami | G06F 1/08 710/110 |
| 2020/0004994 A1* | 1/2020 | Hershman | G06F 21/85 |
| 2020/0296825 A1* | 9/2020 | Ozdoganlar | H01L 23/4985 |

* cited by examiner

*Primary Examiner* — Henry Tsai
*Assistant Examiner* — Christopher A Daley
(74) *Attorney, Agent, or Firm* — Grossman Tucker Perreault & Pfleger, PLLC

(57) ABSTRACT

A serial peripheral interface circuit includes a serial peripheral interface device with a master-in-slave-out (MISO) line, a master-out-slave-in (MOSI) line, a serial clock (SCLK) line and a slave select (SS) line, a first conducting line, a second conducting line, a first resistor connecting the MISO line and the first conducting line, and a second resistor connecting the MOSI line and the second conducting line.

10 Claims, 3 Drawing Sheets

PATENT

SERIAL PERIPHERAL INTERFACE CIRCUIT AND CALIBRATION METHOD OF SERIAL PERIPHERAL INTERFACE SYSTEM

BACKGROUND

1. Technical Field

This disclosure relates to an interface circuit, and more particularly, to a serial peripheral interface (SPI) circuit.

2. Related Art

The SPI is a synchronous serial communication interface specification used for short-distance communication, primarily in embedded systems. A typical SPI bus specifies four logic signal lines: serial clock (SCLK) line, master-out-slave-in (MOSI) line, master-in-slave-out (MISO) line and slave select (SS) line. These logic signal lines may be implemented by separately disposed conducting lines on a circuit board.

However, during the manufacturing process, those conducting lines might be short circuited. Especially when the short-circuiting occurs between the MISO line and the MOSI line, the SPI transmission voltage will be pulled down, which may cause SPI devices to recognize incorrect logic results.

SUMMARY

Accordingly, this disclosure provides a serial peripheral interface (SPI) circuit and a calibration method of a serial peripheral interface system.

According to one or more embodiment of this disclosure, a serial peripheral interface circuit includes a serial peripheral interface device with a master-in-slave-out (MISO) line, a master-out-slave-in (MOSI) line, a serial clock (SCLK) line and a slave select (SS) line, a first conducting line, a second conducting line, a first resistor connecting the MISO line and the first conducting line, and a second resistor connecting the MOSI line and the second conducting line.

According to one or more embodiment of this disclosure, a calibration method of a serial peripheral interface system is disclosed. The disclosed calibration method may include: providing the serial peripheral interface system having a serial peripheral interface circuit defined by a serial peripheral interface device with a MISO line, a MOSI line, a SCLK line and a SS line, a first conducting line, a second conducting line, a first resistor connecting the MISO line and the first conducting line, a second resistor connecting the MOSI line and the second conducting line, and a slave device having a MISO port connected to the first conducting line, a MOSI port connected to the second conducting line, a SCLK port connected to the SCLK line and a SS port connected to the SS line, wherein the serial peripheral interface is a master device; measuring a first voltage on the MISO line when the slave device outputs a first logic high signal through the first conducting line; measuring a second voltage on the second conducting line when the master device outputs a second logic high signal through the MOSI line; and replacing the first resistor with a third resistor and replacing the second resistor with a fourth resistor when the first voltage is not higher than a high-level input voltage of the master device or the second voltage is not higher than a high-level input voltage of the slave device. It is worth noting that the resistance of the third resistor is larger than the first resistor, and the resistance of the fourth resistor is larger than the second resistor.

In view of the above description, the SPI circuit with replaceable resistors on the connection between the MISO ports and the connection between the MOSI ports may realize the calibration of the transmission voltages on the connections. With the appropriate resistors, the transmission voltages on the connections may be adjusted to reflect correct logic to the SPI devices even the connections between the MISO ports and the MOSI ports are short circuited.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
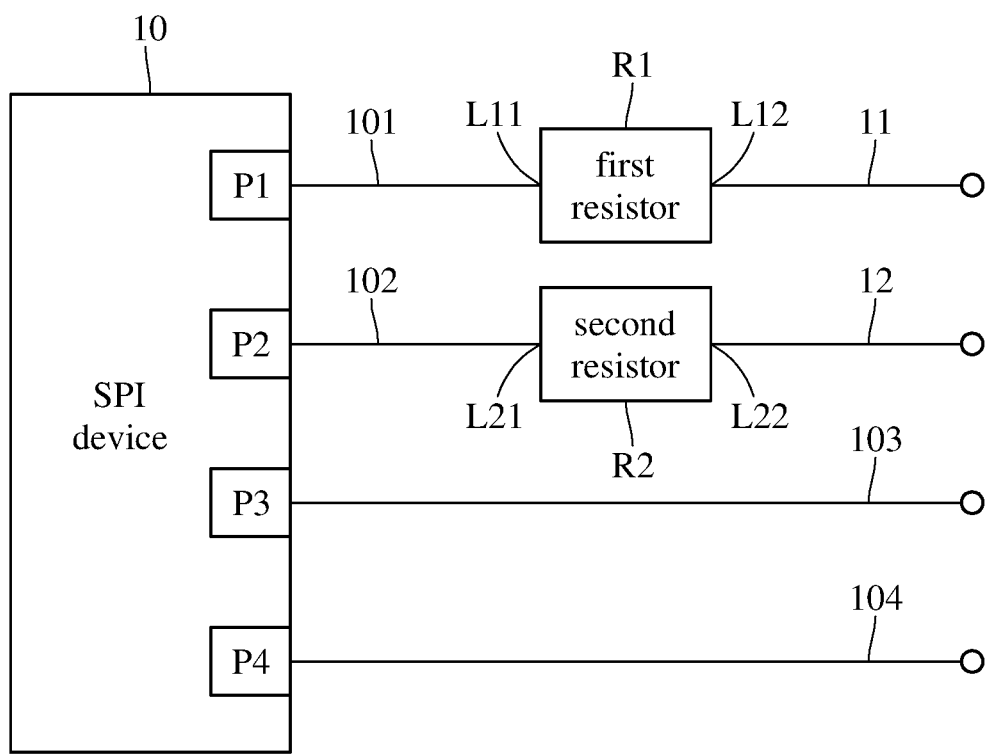
FIG. 1 is a function block diagram of a serial peripheral interface (SPI) circuit according to an embodiment of this disclosure.

Please refer to FIG. 1, a function block diagram of a serial peripheral interface (SPI) circuit according to an embodiment of this disclosure. As shown in FIG. 1, a SPI circuit 1 may include a SPI device 10, a first resistor R1, a second resistor R2, a first conducting line 11 and a second conducting line 12. The SPI device 10 may have a master-in-slave-out (MISO) line 101, a master-out-slave-in (MOSI) line 102, a serial clock (SCLK) line 103 and a slave select (SS) line 104. More particularly, the SPI device 10 may include a MISO port P1, a MOSI port P2, a SCLK port P3 and a SS port P4. The MISO line 101 may be implemented by a conducting line extending from the MISO port P1. The MOSI line 102 may be implemented by another conducting line extending from the MOSI port P2. The SCLK line 103 and the SS line 104 may be implemented by conducting lines extending from the SCLK port P3 and the SS port P4 respectively. The first resistor R1 may connect the MISO line 101 and the first conducting line 11. The second resistor R2 may connect the MOSI line 102 and the second conducting line 12. More particularly, the first resistor R1 may have two leads L11 and L12 connected to the MISO line 101 and the first conducting line 11 respectively, and the second resistor R2 may have two leads L21 and L22 connected to the MOSI line 102 and the second conducting line 12 respectively. The first and second resistors R1 and R2 may be zero-ohm resistors, and may be replaceable.

The first conducting line 11 may further be connected to the MISO port of another SPI device, hereinafter referred to as "second SPI device" in which case the SPI device 10 is referred to as "first SPI device," and the second conducting line 12 may further be connected to the MOSI port of the second SPI device. Either the first SPI device or the second SPI device may be a master device (e.g., DSP, MCU), and the other may be a slave device (e.g., EEPROM). The MISO line 101, the first resistor R1 and the first conducting line 11 may form a first signal line. The MOSI line 102, the second resistor R2 and the second conducting line 12 may form a second signal line. The first SPI device may perform data transmission with the second SPI device through the first signal line and the second signal line. More particularly, the data transmission may be half-duplex. In other words, the valid data is only on one of the first and second signal lines at the same time. The SCLK line 103 may be connected to the SCLK port of the second SPI device, and the SS line 104 may be connected to the SS port of the second SPI device. The data transmission through the SCLK line and the SS line may be the same as that through the conventional SCLK line and SS line, and therefore will not be described in detail herein. The SPI circuit 1 and the second SPI device may be disposed on the same circuit board, or the SPI circuit 1 and the second SPI device may be disposed on different circuit boards and connected to each other through vias.

Figure 2:
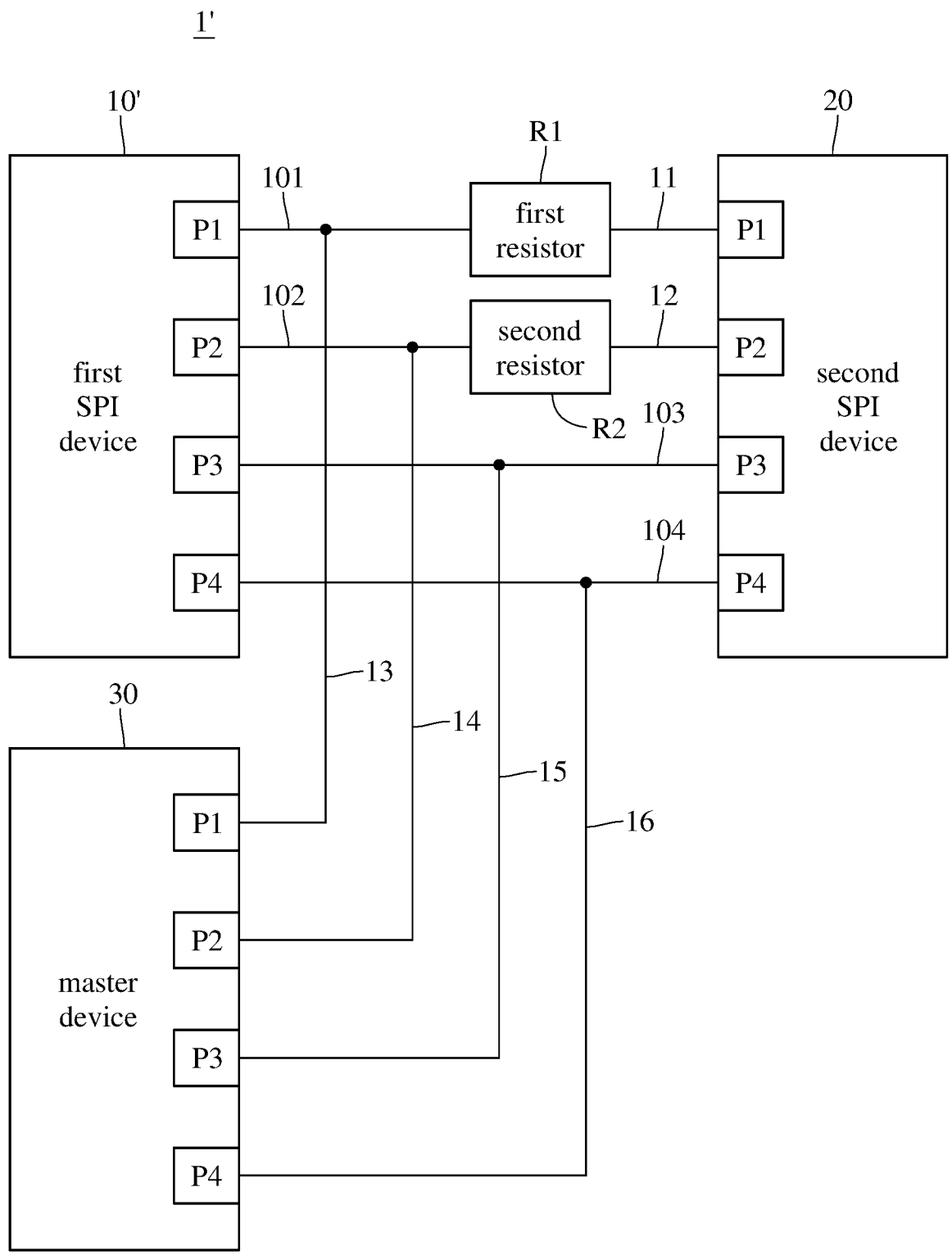
FIG. 2 is a function block diagram of a SPI circuit according to another embodiment of this disclosure.

Please refer to FIG. 2, a function block diagram of a SPI circuit according to another embodiment of this disclosure. As shown in FIG. 2, a SPI circuit 1' may include a first SPI device 10', a second SPI device 20 and a master device 30 each of which includes a MISO port P1, a MOSI port P2, a serial clock (SCLK) port P3 and a slave select (SS) port P4. More particularly, one of the first SPI device 10' and the second SPI device 20 may be a master device, and the other may be a slave device. For example, the first SPI device 10' may be a EEPROM (as a slave), the second SPI device 20 may be a DSP (as a master), and the master device 30 may be a MCU.

The SPI circuit 1' may also include a first resistor R1, a second resistor R2, a first conducting line 11 and a second conducting line 12, which may be the same as those included in the SPI circuit 1 in FIG. 1. The first SPI device 10' may have a MISO line 101 a MOSI line 102, a SCLK line 103 and a SS line 104, which may be the same as those of the SPI device 10 in FIG. 1. The connection between the MISO ports P1 of the first SPI device 10' and the second SPI device 20, the connection between the MOSI ports P2 of the first SPI device 10' and the second SPI device 20, and the data transmission between the first SPI device 10' and the second SPI device 20 may be the same as those between the SPI device 10 in FIG. 1 and the second SPI device as described in the above embodiment, and therefore the details will not be repeated. The SCLK line 103 may connect the SCLK ports P3 of the first SPI device 10' and the second SPI device 20, and the SS line 104 may connect the SS ports P4 of the first SPI device 10' and the second SPI device 20. The data transmission through the SCLK line 103 and the SS line 104 may be the same as that through the conventional SCLK line and SS line, and therefore will not be described in detail herein.

The SPI circuit 1' may further include a third conducting line 13, a fourth conducting line 14, a fifth conducting line 15 and a sixth conducting line 16.

The third conducting line 13 may be connected to the MISO line 101 and the MISO port P1 of the master device 30. The fourth conducting line 14 may be connected to the MOSI line 102 and the MOSI port P2 of the master device 30. The fifth conducting line 15 may be connected to the SCLK line 103 and the SCLK port P3 of the master device 30. The sixth conducting line 16 may be connected to the SS line 104 and the SS port P4 of the master device 30. As mentioned above, one of the first SPI device 10' and the second SPI device 20 may be a master device and the other may be a slave device. The master device 30 may perform the corresponding data receiving with the slave device through the connection between the MISO ports P1 of the master device 30 and the slave device. The master device may perform the corresponding data transmitting with the slave device through the connection between the MOSI ports P2 of the master device 30 and the slave device. More particularly, the data transmission including the above-mentioned data receiving and transmitting may be half-duplex.

In yet another embodiment, a SPI circuit may be the same as the SPI circuit 1' except for the connection of the third conducting line 13 and the fourth conducting line 14. In this embodiment, more specifically, the third conducting line 13 may be connected to the first conducting line 11, and the fourth conducting line 14 may be connected to the second conducting line 12.

It should be noted that the master device 30, the third conducting line 13, the fourth conducting line 14, the fifth conducting line 15 and the sixth conducting line 16 are optional elements.

With replaceable resistors on the connection between the MISO ports and the connection between the MOSI ports, the SPI circuit may render possible calibrating the transmission voltage on the connections. More particularly, if the MISO line and the MOSI line or the first conducting line and the second conducting line is short-circuited during the manufacturing process of the SPI circuit, the first resistor and the second resistor may be replaced with other resistors to adjust the corresponding voltages so as to maintain the proper logic levels for all the SPI devices, therefore minimizing the data transmission failure due to the incorrect logic levels.

Figure 3:
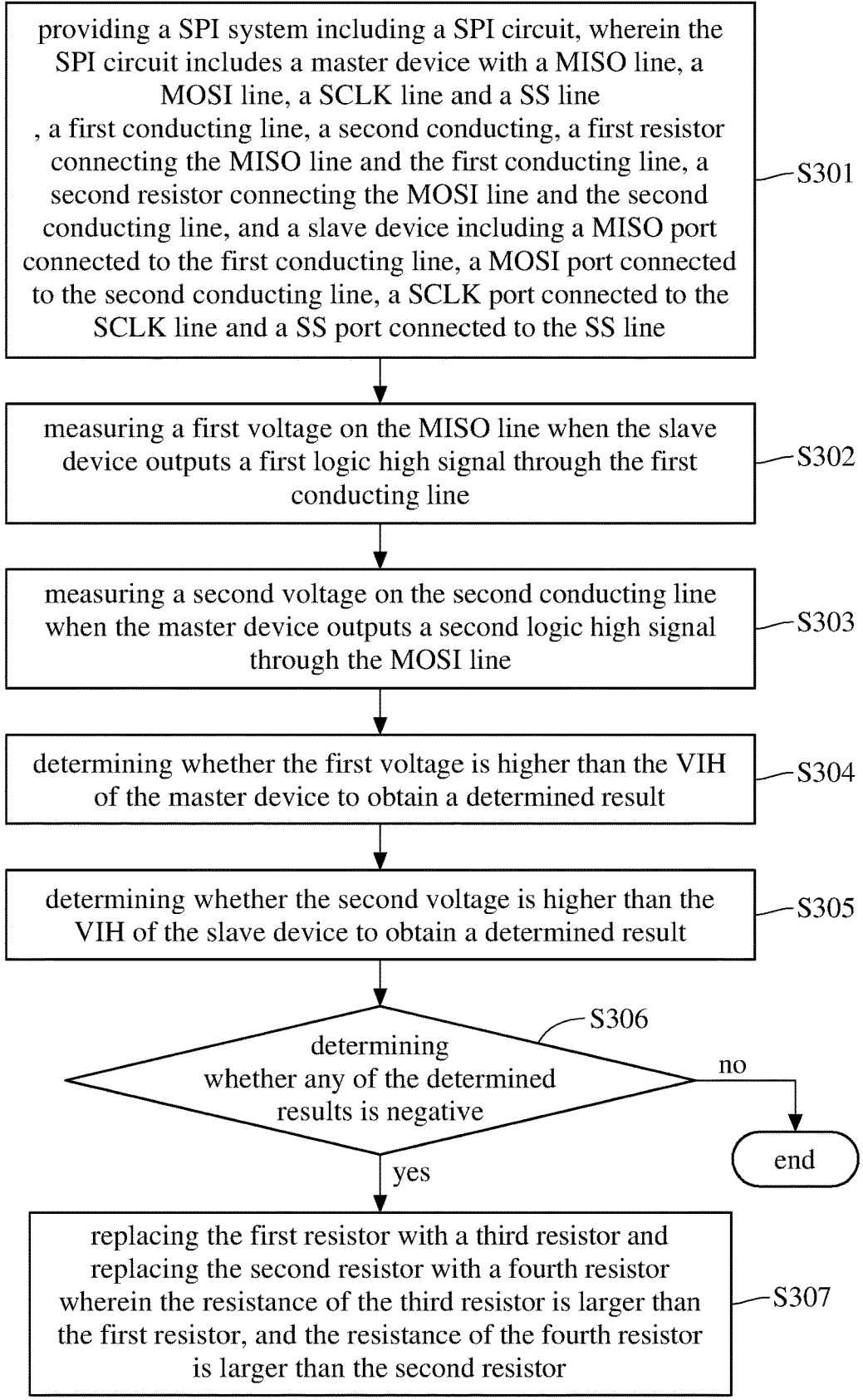
FIG. 3 is a flow chart of a calibration method of a SPI system according to an embodiment of this disclosure.

Please refer to FIG. 3 disclosing a flow chart of a calibration method of a SPI system according to an embodiment of this disclosure. As shown in FIG. 3, the calibration method of a SPI system may include step S301: providing a SPI system including a SPI circuit having a master device with a MISO line, a MOSI line, a SCLK line and a SS line, a first conducting line, a second conducting, a first resistor connecting the MISO line and the first conducting line, a second resistor connecting the MOSI line and the second conducting line, and a slave device including a MISO port connected to the first conducting line, a MOSI port connected to the second conducting line, a SCLK port connected to the SCLK line and a SS port connected to the SS line. The disclosed calibration method might further include step S302: measuring a first voltage on the MISO line when the slave device outputs a first logic high signal through the first conducting line.

In step S303, the disclosed calibration method might include measuring a second voltage on the second conducting line when the master device outputs a second logic high signal through the MOSI line. The disclosed calibration method in step S304 might further include determining whether the first voltage is higher than the high-level input voltage (VIH) of the master device. In step S305, the same disclosed calibration approach might include determining whether the second voltage is higher than the VIH of the slave device. In step S306, the disclosed method might include determining whether any of the steps S304 and S305 comes back negative. If so, the calibration method might proceed to step S307 to enable the replacement of the first resistor with a third resistor (with its resistance larger than that of the first resistor) and the second resistor with a fourth resistor (with its resistance larger than that of the second resistor). Otherwise, the disclosed calibration method may be ended.

It should be noted that the order of steps S302-S305 may be changed so long as the step S304 is followed by step S302 and step S305 is followed by step S303.

The SPI circuit included in the SPI system in step S301 may be implemented by the SPI circuit 1 in FIG. 1 connected with a slave device, while the SPI device 10 in the SPI circuit 1 may serve as the master device. Steps S302-S306 may be performed by an operator or a calibration system including a voltage detector for performing step S302 and S303, a processor for performing steps S304-S306 and an output device for outputting the result of step S306. The positive result (i.e., "yes") of step S306 may indicate that the connection between the MISO line and the MOSI line or between the first conducting line and the second conducting line might have been short circuited. Step S307 may be performed to reduce the impact associated with the connection being short circuited. With the replacement of the first resistor with the third resistor and the second resistor with the fourth resistor, the first voltage and the second voltage may be pulled up while the currents of logic high signals remain unchanged.

More particularly, after step S307, steps S302-S306 may be performed again to check whether the first voltage and the second voltage are adjusted to the correct logic levels. If the results still come back negative, the third and fourth resistors may be replaced with other resistors. Moreover, the calibration method may further include, after step S307, determining whether the voltage on the MISO line when the slave device outputs a logic low signal through the first conducting line is lower than the low-level input voltage (VIL) of the master device, determining whether the voltage on the second conducting line when the master device outputs a logic low signal through the MOSI line is lower than the VIL of the slave device. And if the voltage on either the first or the second conducting line is lower than the VIL, the third and fourth resistors may be replaced with other resistors. The first and second resistors may be finally replaced with resistors that may ensure the input voltages of all the SPI devices to reflect the correct logic. The actual value of the resistances of the resistors replacing the first and second resistors may depend on the condition of the short circuit.

In another embodiment, the SPI circuit in the SPI system may be implemented by the SPI circuit 1' in FIG. 2. In this embodiment, in addition to steps S301-S307 as described above, the calibration method may further include steps between step S301 and S306. More specifically, the additional steps may include: measuring a third voltage on the third conducting line 13 in FIG. 2 when the slave device outputs the first logic high signal, and determining whether the third voltage is higher than the VIH of the master device 30 in FIG. 2. Therefore, the determination step in step S306 may further include the performance of those extra steps.

In view of the above description, the SPI circuit with replaceable resistors on the connection between the MISO ports and the connection between the MOSI ports may render possible calibrating the transmission voltages on the connections. By replacing the initially disposed resistors with appropriate ones, the transmission voltages on the connections may be adjusted to reflect the correct logic even in the event of the connections being short-circuited.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. A serial peripheral interface circuit, comprising:
a serial peripheral interface device with a master-in-slave-out (MISO) line, a master-out-slave-in (MOSI) line, a serial clock (SCLK) line and a slave select (SS) line, wherein the serial peripheral interface is a master device;
a first conducting line;
a second conducting line;
a first resistor connecting the MISO line and the first conducting line; and
a second resistor connecting the MOSI line and the second conducting line; and
a slave device comprising a MISO port connected to the first conducting line, a MOSI port connected to the second conducting line, a SCLK port connected to the SCLK line and a SS port connected to the SS line, wherein the serial peripheral interface circuit is configured to be calibrated by:
measuring a first voltage on the MISO line when the slave device outputs a first logic high signal through the first conducting line;
measuring a second voltage on the second conducting line when the master device outputs a second logic high signal through the MOSI line; and
replacing the first resistor with a third resistor and replacing the second resistor with a fourth resistor when the first voltage is not higher than a high-level input voltage of the master device or the second voltage is not higher than a high-level input voltage of the slave device, wherein the resistance of the third resistor is larger than the first resistor, and the resistance of the fourth resistor is larger than the second resistor.

2. The serial peripheral interface circuit according to claim 1, wherein the first resistor has two leads connected to the MISO line and the first conducting line respectively, wherein the second resistor has two leads connected to the MOSI line and the second conducting line respectively.

3. The serial peripheral interface circuit according to claim 1, wherein the first resistor and the second resistor are zero-ohm resistors.

4. The serial peripheral interface circuit according to claim 1, further comprising another serial peripheral interface device comprising a MISO port connected to the first conducting line and a MOSI port connected to the second conducting line.

5. The serial peripheral interface circuit according to claim 1, further comprising:
a third conducting line connected to the MISO line; and
a fourth conducting line connected to the MOSI line.

6. The serial peripheral interface circuit according to claim 5, further comprising a master device comprising a MISO port connected to the third conducting line and a MOSI port connected to the fourth conducting line.

7. The serial peripheral interface circuit according to claim 1, further comprising:
a third conducting line connected to the first conducting line; and
a fourth conducting line connected to the second conducting line.

8. The serial peripheral interface circuit according to claim 7, further comprising a master device comprising a MISO port connected to the third conducting line and a MOSI port connected to the fourth conducting line.

9. The serial peripheral interface circuit according to claim 1, wherein the MISO line, the first resistor and the first conducting line form a first signal line, the MOSI line, the second resistor and the second conducting line form a second signal line, and the serial peripheral interface device is configured to perform half-duplex data transmission with another serial peripheral interface device through the first signal line and the second signal line.

10. A calibration method of a serial peripheral interface system, comprising:
providing the serial peripheral interface system comprising a serial peripheral interface circuit, wherein the serial peripheral interface circuit comprises:
   a serial peripheral interface device with a MISO line, a MOSI line, a SCLK line and a SS line;
   a first conducting line;
   a second conducting line;
   a first resistor connecting the MISO line and the first conducting line;
   a second resistor connecting the MOSI line and the second conducting line; and
   a slave device comprising a MISO port connected to the first conducting line, a MOSI port connected to the second conducting line, a SCLK port connected to the SCLK line and a SS port connected to the SS line,
wherein the serial peripheral interface is a master device;
measuring a first voltage on the MISO line when the slave device outputs a first logic high signal through the first conducting line;
measuring a second voltage on the second conducting line when the master device outputs a second logic high signal through the MOSI line; and
replacing the first resistor with a third resistor and replacing the second resistor with a fourth resistor when the first voltage is not higher than a high-level input voltage of the master device or the second voltage is not higher than a high-level input voltage of the slave device, wherein the resistance of the third resistor is larger than the first resistor, and the resistance of the fourth resistor is larger than the second resistor.

\* \* \* \* \*

UNITED STATES PATENT AND TRADEMARK OFFICE
CERTIFICATE OF CORRECTION

| | | |
|---|---|---|
| PATENT NO. | : 11,768,785 B2 | Page 1 of 1 |
| APPLICATION NO. | : 17/678320 | |
| DATED | : September 26, 2023 | |
| INVENTOR(S) | : Lai et al. | |

It is certified that error appears in the above-identified patent and that said Letters Patent is hereby corrected as shown below:

On the Title Page

Item (72), in Column 1, under "Inventors", delete "Hsin-Wen Lin, New Taipei (CN)" and insert -- Hsin-Wen Lin, New Taipei (TW) --, therefor.

Signed and Sealed this
Seventh Day of November, 2023

Katherine Kelly Vidal
*Director of the United States Patent and Trademark Office*